United States Patent
Hedy

(10) Patent No.: US 6,988,085 B2
(45) Date of Patent: Jan. 17, 2006

(54) SYSTEM AND METHOD FOR REAL-TIME ELECTRONIC INQUIRY, DELIVERY, AND REPORTING OF CREDIT INFORMATION

(76) Inventor: Shad Hedy, 2335 Covington Creek Cir. West, Jacksonville, FL (US) 32224

(*) Notice: Subject to any disclaimer, the term of this patent is extended or adjusted under 35 U.S.C. 154(b) by 0 days.

(21) Appl. No.: 09/420,885

(22) Filed: Oct. 19, 1999

(65) Prior Publication Data

US 2003/0041031 A1 Feb. 27, 2003

(51) Int. Cl.
G06F 17/60 (2006.01)

(52) U.S. Cl. .............................. 705/51; 705/1; 705/14; 705/26; 705/35; 705/36; 705/37; 705/38; 705/39; 705/40; 705/44; 709/217; 709/223; 235/375; 235/379; 235/380; 707/3; 707/10

(58) Field of Classification Search ...................... 705/1, 705/14, 26, 35–40, 44, 51; 709/217, 230; 235/375, 379, 380; 707/3, 10; 380/200, 201, 380/239; 713/200, 201, 187, 191; 372/52; 379/90.01; 370/350
See application file for complete search history.

(56) References Cited

U.S. PATENT DOCUMENTS

| | | | | |
|---|---|---|---|---|
| 5,010,571 A | * | 4/1991 | Katznelson | .................... 380/4 |
| 5,239,462 A | | 8/1993 | Jones et al. | |
| 5,274,547 A | * | 12/1993 | Zoffel et al. | .................. 705/38 |
| 5,611,052 A | | 3/1997 | Dykstra et al. | |
| 5,671,279 A | | 9/1997 | Elgamal | |
| 5,774,882 A | | 6/1998 | Keen et al. | |
| 5,825,881 A | | 10/1998 | Colvin, Sr. | |
| 5,857,191 A | * | 1/1999 | Blackwell et al. | ............ 707/10 |
| 5,864,828 A | | 1/1999 | Atkins | |
| 5,870,721 A | | 2/1999 | Norris | |
| 5,873,072 A | | 2/1999 | Kight et al. | |
| 5,878,403 A | * | 3/1999 | DeFrancesco et al. | ........ 705/38 |
| 5,884,285 A | | 3/1999 | Atkins | |
| 6,501,779 B1 | * | 12/2002 | McLaughlin et al. | ......... 372/52 |

FOREIGN PATENT DOCUMENTS

CA 2424177 A1 * 10/2004

OTHER PUBLICATIONS

Equifax. Jun. 3, 1999. http://www.equifax.com/consumer/faqs/credit/security.html. Retreived from IDS.*

O'Harrow, Robert jr. and Chandrasekaran, Rajiv. Credit Reports Made Available Online. Aug. 15, 1997. The Washington Post; p. D01. Retrieved online.*

(Continued)

Primary Examiner—James A Reagan
(74) Attorney, Agent, or Firm—Ashkan Najafi, P.A.

(57) ABSTRACT

A system and method for providing electronic inquiry, delivery, and reporting of personal credit information to and from credit bureaus, preferably via the Internet. In the preferred embodiment, the system includes a web site that, by using a web browser, allows clients to request credit information from, or provide credit reports to, credit bureaus by entering certain data on pre-built forms in HTML format. The data is encrypted using means for secure transmission, such as a web browser with 128-bit secure socket layer (SSL) technology, then sent to a common gateway interface (CGI) application located on a web server. The CGI application decrypts and reformats the data to a standard format specified by the credit bureau. The CGI application initiates a query. Using a dedicated connection circuit to the credit bureau's computer, the CGI application reformats the response from the credit bureau to an HTML format and encrypts the data using the means for secure transmission. The HTML formatted data is then sent back to the client's computer over the Internet and displayed in the client's web browser in an easily read format.

24 Claims, 16 Drawing Sheets

OTHER PUBLICATIONS

Go Network, "Go Network: Credit reports," <http://www.go.com/WebDir/Money/Investing/Real_e . . . /Credit_reports?lk=noframes&svx=relate>, viewed Jun. 3, 1999.

Equifax, "Equifax: Changing the Shape of Global Commerce," <http://www.equifax.com/>, viewed Jun. 3, 1999.

Equifax, "Equifax: Consumers," <http://www.equifax.com/consumers/consumers.html>, viewed Jun. 3, 1999.

Equifax, "Equifax—Order Your Credit Profile: Welcome," <http://www.equifax.com/consumer/product/credit-profile/web/welcome>, viewed Jun. 3, 1999.

Equifax, "What about Online Security?", <http://www.equifax.com/consumer/faqs/credit/security.html>, viewed Jun. 3, 1999.

ASI Credit Reports, "Credit Reports Shipped Today—Trans Union/Equifax," <http://www.asicreditreport.com/>, viewed Jun. 3, 1999.

Credit Data Exchange, Inc., "Consumer Credit Reports," <http://www.cdxinfo.com/concr.htm>, viewed Jun. 3, 1999.

Consumerinfo.com, "Credit Report, Free Trial Offer," <http://www.consumerinfo.com/>, viewed Jun. 3, 1999.

Credit.Com, "Credit.Com: Visitor Hub & Homepage," <http://www.credit.com/index.html?checkcookie=1>, viewed Jun. 3, 1999.

Credit411.Com, "Credit 411: Credit Reports & Credit Monitoring Online," <http://www.credit411.com/>, viewed Jun. 3, 1999.

National Credit Source, Inc., "Order Your Credit Report Now from NCS–Fast and Secure Delivery," <http://www.swiftsite.com/ncs/>, viewed Jun. 3, 1999.

National Credit Source, Inc., "Privacy Policy—American Credit Source," <http://www.swiftsite.com/ncs/creditprivacy.htm>, viewed Jun. 3, 1999.

* cited by examiner

FIG. 10

Report on 138597890, retrieved from Equifax on Fri Oct 8 19:16:41 GMT 1999

| | | | | | |
|---|---|---|---|---|---|
| Name: | HERMAN, A. LEE | | Since: 121598 | FAD: | 21999 |
| SSN: | 138597890 | | | | |
| DOB: | 120161 | | | | |
| Former Name: | HERMAN, LEE, A | | | | |
| Curr. Addr: | 1500 RIVERHILL DR, ATLANTA, GA 30328 | Phone#: | | Date Reported: 1298 | Source: TAPE |
| Employer: | ZACHARY CO | | | | |

Summary & Safescan

| Trad: 4 | Leg: | Bkrp: | Coll: | Forcl: | No-resp: | Tax Ln: | Gam: | For.Inq.: | Inq.: 6 |
|---|---|---|---|---|---|---|---|---|---|
| SafeScan: | | | | | | | | | |

Trade Statistics:

| Max High Crdt: 25.0K   Min High Crdt: 25.0K   Tot Curr Balance:   Tot Past Due: |
|---|
| First Date Opened: 980701   Last Date Reported: 990201   No of Accounts Past Due: |
| 30 days late:   60 days late:   90 days late: |
| Manner of Pmnt: 0s:3  1s:1  2s:  3s:  4s:  5s:  6s:  7s:  8s:  9s:  other: |

Public Record & Miscellaneous:

Consumer Statement:

Foreign Inquiries:

| Date | City & Narrative | State & Narrative |
|---|---|---|

FIG. 13A

Inquiries:

| Member Name | Member # | Date | Member Name | Member # | Date |
|---|---|---|---|---|---|
| JAX CTY FN | 217FA00213 | 021999 | JAX CTY FN | 217FA00213 | 021099 |
| JAX CTY FN | 217FA00213 | 020999 | ADS | 999ZS00472 | 012999 |
| PANTEX | 611FC08345 | 121898 | 1ST BREMEN | 667BB09727 | 121598 |

Trades:

| Member Name | Member # | RPTD | OPND | H/C | Term | Balance | Past Due | Type | MP | I/J | Acct# | DL# | 30 | 60 | 90 | MR | Acct Stat |
|---|---|---|---|---|---|---|---|---|---|---|---|---|---|---|---|---|---|
| BOFA CARD | 1808B19097 | 0299 | 0199 | 25.0K | | | | Rev | 0 | Ind | | | | | | | Real estate mortgageAmmount in H/C column is credit limit |
| BOFA CARD | 1808B19097 | 0299 | 0199 | 25.0K | | | | Rev | 0 | Ind | | | | | | | Real estate mortgageAmmount in H/C column is credit limit |
| BOFA CARD | 1808B19097 | 0199 | 0199 | 25.0K | | | | Rev | 0 | Ind | | | | | | | Real estate mortgageAmmount in H/C column is credit limit |
| BOFA CARD | 1808B19097 | 0199 | 0798 | 25.0K | | | | Rev | 1 | Ind | | | | | | 6 | Credit cardAmmount in H/C column is credit limit |

Online Directory:

| Member # | Company Name | Phone# | Member # | Company Name | Phone# |
|---|---|---|---|---|---|
| 189BB19097 | BOFA CARD | 8002338181 | 217FA00213 | JAX CTY FN | 9043568491 |
| 611FC08345 | PANTEX | 8062735692 | 667BB09727 | 1ST BREMEN | 6146813170 |

Beacon Scoring:

| | |
|---|---|
| Score: | 00743 |
| Code1: | 14 |
| Code2: | 9 |
| Code3: | This is eight |
| Code4: | |
| Reject Code: | |

| | | | | | | |
|---|---|---|---|---|---|---|
| Name: | HERMAN, SARAH. | | Since: | 80492 | FAD: | 21999 |
| SSN: | 166447890 | | | | | |
| DOB: | 070766 | | | | | |
| Curr. Addr: | 1500 RIVERHILL DR DR, ATLANTA, GA 30323 | | Phone#: | | Date Reported: 1093 | Source: CRT |
| 1st Former Addr: | 123 MAIN, BURBANK, CA 91502 | | Phone#: | | Date Reported: 0498 | Source: DAT |
| Employer: | FGFGFG | | | | | |
| Former Employer: | MAGNUM | | | | | |

Summary & Safescan

| Trad: | 1 | Leg: | Bkrp: | Coll: | Forcl: | No-resp: | Tax Ln: | Garn: | For.Inq.: 4 | Inq.: 82 |
|---|---|---|---|---|---|---|---|---|---|---|
| SafeScan: | | | | | | | | | | |

Trade Statistics:

| Max High Crdt: | Min High Crdt: | Tot Curr Balance: | Tot Past Due: |
|---|---|---|---|
| First Date Opened: 930401 | Last Date Reported: 951201 | No of Accounts Past Due: | |
| 30 days late: | 60 days late: | 90 days late: | |
| Manner of Pmnt: 0s: | 1s: 1 2s: 3s: 4s: 5s: 6s: 7s: 8s: 9s: other: | | |

Public Record & Miscellaneous:

Consumer Statement:

Foreign Inquiries:

| Date | City & Narrative | State & Narrative |
|---|---|---|
| 042398 | 180ZB04756 | INFO RESER |
| 110398 | 401ZB02533 | EHIIS |
| 121498 | FK 644ZS04437 | FST DTA CP |
| 121698 | FK 644ZS04437 | FST DTA CP |

Inquiries:

FIG. 13B

| Member Name | Member # | Date | Member Name | Member # | Date |
|---|---|---|---|---|---|
| JAX CTY FN | 217FA00213 | 021999 | JAX CTY FN | 217FA00213 | 021199 |
| SEFCU | 682FC00036 | 021199 | 1ST BREMEN | 667BB09727 | 021099 |
| JAX CTY FN | 217FA00213 | 021099 | SEFCU | 682FC00036 | 021099 |
| JAX CTY FN | 217FA00213 | 020999 | JAX CTY FN | 217FA00213 | 020899 |
| SEFCU | 682FC00036 | 020399 | SEFCU | 682FC00036 | 011599 |
| SEFCU | 682FC00036 | 011499 | SEFCU | 682FC00036 | 011399 |
| CLLCT AMRC | 146YC10638 | 111298 | STERLING | 594JA10751 | 110298 |
| PRIME | 682FM110937 | 102698 | CBTBKHAWAI | 944ON00036 | 101698 |
| PAC I NA | 770BB04662 | 093098 | MAGNUM | 999XZ00123 | 092998 |
| FIRST HAWN | 770BB02849 | 092898 | SO TEACHER | 774FC00013 | 090498 |
| MICRO/COIN | 999DC00563 | 081098 | MICRO/COIN | 999DC00563 | 080798 |
| STHELEN CU | 133FC03132 | 080698 | AM DIR CR | 118FP02063 | 080598 |
| CHOICEPT | 502IG25272 | 071398 | SPRINT | 910UT04470 | 060898 |
| US FED CU | 613FC17789 | 060298 | NORWEST | 999ZS00365 | 052698 |
| PACE CU | 133FC03686 | 051898 | PACE CU | 133FC03686 | 051498 |
| FIRST PLUS | 682FM06156 | 050698 | US FED CU | 613FC17789 | 042798 |
| US FED CU | 613FC17789 | 042298 | PACE CU | 133FC03686 | 042098 |
| US FED CU | 613FC17789 | 041698 | COL GAS | 910UC00268 | 041498 |
| COLUMBIA | 910UG01613 | 040298 | AUTO DT PR | 999ZS00233 | 021298 |
| SPRINT | 910UT04751 | 020698 | FIRST PLUS | 682FM06156 | 020598 |
| FNACC | 401FA01342 | 010898 | FNACC | 401FA01342 | 010798 |
| PT LOMA CU | 181FC00063 | 010698 | FCF | 456FP05762 | 112197 |
| TAPCO CU | 701FC06588 | 102997 | TELWRKRSCU | 178FC01637 | 100897 |
| HOUSE BK | 164BB03100 | 092997 | TI FCU | 178FC00266 | 091997 |
| ST EMPL CU | 401FC00037 | 082897 | ST EMPL CU | 401FC00037 | 082797 |
| LEASE CONS | 133FZ02849 | 081897 | BOSCOV | 496DC01010 | 080897 |
| PNC BANK | 458BB04312 | 072597 | HOUSE BK | 164FF01069 | 071597 |
| COMPLT SRC | 243FP03698 | 071097 | INFORMATIV | 180ZB02784 | 062397 |
| INFORMATIV | 180ZB02784 | 062097 | COMPLT SRC | 243FP03698 | 061897 |
| COMPLT SRC | 243FP03698 | 061797 | COMPLT SRC | 243FP03698 | 061297 |
| ISTAMIND | 772BB25758 | 060597 | HOUSE BK | 164BB03100 | 060497 |
| HOUSE BK | 164BB03100 | 060397 | SPRINT | 910UT04751 | 060397 |
| NMAC | 682FA04543 | 060297 | NMAC | 682FA04543 | 052997 |
| ADS | 999FF00136 | 052197 | NORWEST | 613BB16888 | 052097 |
| PROV INDIR | 636BB31305 | 042197 | PROV INDIR | 636BB31305 | 041397 |
| ISTAMIND | 772BB25758 | 041697 | PROV INDIR | 636BB31305 | 041697 |
| USECU | 181FC01780 | 041297 | KEYBANKUSA | 645BB10043 | 040997 |
| USECU | 181FC01780 | 040497 | ENTERGY | 910UE03389 | 040297 |
| EMS-ATL | 401ZB02525 | 040297 | USWNYG | 910UT07499 | 031797 |
| AFSCI | 682FP19123 | 031397 | AFSCI | 682FP19123 | 031297 |
| 1SE CELLUL | 728UT00155 | 030697 | ISTAM NA | 772BB15288 | 022697 |

FIG. 13C

Trades:

| Member Name | Member # | RPTD | OPND | H/C | Term | Balance | Past Due | Type | MP | I/J | Acct# | DLA | 30 | 60 | 90 | MR | Acct Stat |
|---|---|---|---|---|---|---|---|---|---|---|---|---|---|---|---|---|---|
| NORDSTROM | 701DC00529 | 1295 | 0493 | | | | | Rev | I | Shr | | 0894 | | | | 15 | |

Online Directory:

| Member # | Company Name | Phone# | Member # | Company Name | Phone# |
|---|---|---|---|---|---|
| 701DC00529 | NORDSTROM | MAIL ONLY | 217FA00213 | JAX CTY FN | 9043568491 |
| 682FC00036 | SEFCU | 2145655300 | 667BB09727 | 1ST BREMEN | 6146813170 |
| 594JA10751 | STERLING | MAIL ONLY | 682FM10937 | PRIME | 7026842126 |
| 944ON00036 | CBTBKHAWAI | 8002821205 | 770BB04662 | PAC 1 NA | 5032486646 |
| 770BB02849 | FIRST HAWN | 8088443250 | 774FC00013 | SO TEACHER | 2257758597 |
| 133FC03132 | STHELEN CU | 5033972376 | 118FP02063 | AM DIR CR | 2083439692 |
| 910UT04470 | SPRINT | MAIL ONLY | 613FC17789 | US FED CU | 6128542113 |
| 133FC03686 | PACE CU | 5032349851 | 682FM06156 | FIRST PLUS | 2145996400 |
| 910UG01613 | COLUMBIA | MAIL ONLY | 401FA01342 | FNACC | 7707924600 |
| 181FC00063 | PT LOMA CU | 6194953400 | 456FP05762 | FCF | 2529391665 |
| 701FC06588 | TAPCO CU | 2535659895 | 178FC01637 | TELWRKRSCU | 6174396500 |
| 164BB03100 | HOUSE BK | 4087541400 | 178FC00266 | TI FCU | 5082228391 |
| 401FC00037 | ST EMPL CU | 4046563748 | 133FZ02849 | LEASE CONS | 2092215811 |
| 496DC01010 | BOSCOV | 6109297353 | 458BB04312 | PNC BANK | 4127621184 |
| 164FF01069 | HOUSE BK | 4087541400 | 243FP03698 | COMPLT SRC | 7037098100 |
| 772BB25758 | 1STAMIND | 6157817999 | 682FA04543 | NMAC | 8007776116 |
| 636BB31305 | PROV INDIR | 5135792000 | 181FC01780 | USECU | 6195948515 |
| 645BB10043 | KEYBANKUSA | 6173480010 | 910UE03389 | ENTERGY | MAIL ONLY |
| 910UT07499 | USWNYG | 2064496198 | 682FP19123 | AFSCI | MAIL ONLY |
| 728UT00155 | ISB CELLUL | MAIL ONLY | 772BB15288 | 1STAM NA | 6150000000 |

Beacon Scoring:

Score:
Code1:
Code2:
Code3:
Code4:
Reject Code: Beacon not available, no recently reported account information End of Report Click here to return to the Inquiry Form

FIG. 13D

SYSTEM AND METHOD FOR REAL-TIME ELECTRONIC INQUIRY, DELIVERY, AND REPORTING OF CREDIT INFORMATION

BACKGROUND

This invention relates to a computerized information management and processing systems generally, and more particularly to a computer-implemented system and method for automatically sending, retrieving, and delivering credit information via the Internet. In one aspect, the present invention pertains to a system for providing real-time electronic inquiry and delivery of personal credit information to any remote user (i.e., client) having an appropriate computer and Internet access software. In a second aspect, the present invention pertains to a method of using the Internet and web sites for accepting client requests for credit information in HyperText Markup Language (HTML) format, acquiring the information from credit information repositories or bureaus by converting the HTML requests to a format the credit bureau will accept, reformatting the response from the credit bureau back into HTML format, and transmitting the HTML response to the client's computer.

When a potential borrower wishes to obtain a loan to finance a major consumer purchase such as a house or automobile, the vendor or lending institution usually requires the potential borrower to fill out a loan application. Typically, the applicant completes the application by hand, providing information such as name, address, social security number, employer, and previous addresses. The information contained in the application can be confidential in nature and should be protected from inadvertent disclosure to those not having a need-to-know.

Using information from the loan application, a sales representative or loan officer may request an inquiry copy of the applicant's credit report from a credit bureau. Currently, the United States has three major credit bureaus—Equifax, Trans Union, and Experian (formerly TRW). Hundreds of smaller credit bureaus exist, but virtually all are affiliated with one more of the three major credit bureaus. The sales representative or loan officer may request the inquiry copy, for example, by using a personal computer having appropriate software, by calling the credit bureau to obtain a teletype (TTY) credit report, or by on-line request using a teleprompter, which is a small terminal provided by the credit bureau. Access is typically by conventional dial-up methods. Information returned in the response from the credit bureau is also confidential and should be protected.

Credit bureaus receive income from subscribers for the credit bureau's services. Credit bureaus charge the subscribers a fee whenever the subscribers "pull" a credit report. In return, the credit bureaus maintain the files of credit information and provide the information to their subscribers. Credit bureaus update their files by using, for example, the inquiries or requests made by subscribers and accounts receivable tapes provided by subscribers. In addition, each credit bureau has its own format for receiving requests from, and sending responses to, its subscribers. Certain items in credit bureau inquiry responses are encoded or abbreviated such that the information in the response may be very difficult to read and understand, which can adversely impact loan application decisions.

The current approaches for request and delivery of credit inquiries have, but are not necessarily limited to, and following problems and drawbacks. First, requests and responses transmitted using modems and conventional dial-up lines may not be encrypted or provide adequate security for the confidential information. Second, current credit inquiry systems may require users to maintain proprietary software on their computers, which could be costly. In addition, responses derived to subscribers using the credit bureau's format may be difficult to read and understand. Finally, current systems often do not enable businesses to provide to credit bureaus on-line credit reports concerning borrowers.

Certain aspects of the credit inquiry and reporting process have been automated to various extents. However, a need exists for a comprehensive system for requesting inquiries from and providing reports to credit bureaus that solves the problems outlined above.

SUMMARY OF THE INVENTION

The present invention provides such a system and method for requesting credit inquiries by clients, delivering responses to credit inquiries from credit bureaus to clients, and reporting credit information by clients to credit bureaus, which eliminate the drawbacks of the currently employed methods of credit inquiry and reporting.

The present invention provides a client-server solution for electronic inquiry, delivery, and reporting of personal credit information to and from credit bureaus using either serial communications and dial-up access, or the Internet and Transmission Control Protocol/Internet Protocol (TCP/IP). In the preferred embodiment, the present invention uses the Internet as a communications link between the client (also referred to as the user) and a service provider's central processing unit (CPU), such as a web server that functions as an intermediary between the client and the credit bureaus.

To access the system of the present invention, the client has the following: (1) access to Internet, such as a personal computer with Internet connection; (2) means for secure transmission over the Internet, such as a web browser with 128-bit secure sockets layer ("SSL") encryption capability (SSL is a standard, for example, in the Netscape Navigator and Microsoft Internet Explorer web browsers); and (3) an account set up on the central processor. In addition, a security certificate issued by a trusted certifying authority, such as Verisoft, is installed on the client's computer and on the central processor. A security certificate is a password-protected, encrypted file of data identifying the transmitting entity. The certificate also includes encryption keys or algorithms, allowing the entities exchanging data to authenticate each other.

The client uses a web browser on the client's computer or terminal to access the web site that is hosted on the service provider's CPU of the present invention. First, the client logs on to the system using a user name and password. Then the client enters data (e.g., customer name, address, and social security number) on an Inquiry Form generated by the CPU. When the client clicks a "SUBMIT" button on the form, the client's web browser encrypts the data using standard 128-bit SSL technology, which is provided by SSL browsers and web servers. If the client's web browser is not a 128-bit SSL version, then the CPU informs the client that such a version must be downloaded before proceeding. The encrypted data, which is in the HTML format, is passed to a common gateway interface (CGI) program application residing on the CPU. CGI is a specification that defines communications between information servers and resources on the server's host computer.

Next, the CGI application decrypts the data, parses the information from the form, and converts the information to a standard format required by the particular credit bureau to receive the request. The credit bureau contacted may be one of the three major credit institutions (i.e., Equifax, Experian, or Trans Union), or any other credit bureau to which access has been previously authorized. The CGI application then places the reformatted data into an input file and initiates a query to the credit bureau's computer. Using a dedicated connection circuit, the CGI application transmits the query to the credit bureau. The credit bureau sends a response to the query to the CPU in non-HTML format.

After the CPU receives the response from the credit bureau, the CGI application creates an output file containing the response from the credit bureau. The CGI application parses and converts the data in the output file to HTML format and encrypts the data, preferably using 128-bit SSL technology. The present invention does not analyze or permanently save the results it receives from the credit bureau. The CGI application then sends the HTML-formatted data back to the client's web browser using the Internet, where the inquiry response is displayed in the client's web browser in a more easily read format.

Traditional means of obtaining an inquiry report involve a teletype machine or software that uses a dial-up process where a modem dials a credit institution modem. Because the CPU of the present invention is directly linked to the credit bureau mainframe computer, no waiting period is required for modem protocol and associated responses from either the CPU or the credit bureau. The transaction can be completed and the response made available to the client in as little as about 5 seconds to about 10 seconds, depending on such factors as, for example, type of computers used, bandwidth, and number of users.

From the foregoing, it will be apparent to the reader that a primary object of the present invention is to provide a novel, improved system and method for requesting credit information from credit bureaus and delivering responses to credit inquiries to users in an easily understood format in shorter periods of time than is possible using current credit inquiry techniques. Thus, the present invention becomes a more valuable tool in providing the credit information necessary for marking credit-related decisions.

Another primary object of the present invention is to provide a system and method for businesses to provide credit information or credit reports on-line to credit bureaus.

A major advantage of the present invention relates to receiving requests for credit information from clients in HTML format and sending responses back to clients in HTML format, which allows industry-standard Internet browsers to collect credit information and display credit inquiry responses from credit bureaus in a more readable format. The present invention provides a standard interface that is transparent to clients—clients do not have to interpret inquiry responses in various formats from different credit bureaus or enter data in various formats on different computer screens. Thus, a more specific object of the invention is to provide a fully automated, computer-based system for electronically inquiring, delivering, and reporting credit information using the Internet and World Wide Web.

Another object of the invention is to provide secure transmission of credit information and a level of security between clients and credit bureaus, wherein all communications pass through the CPU of the present invention and clients or third parties can not directly connect to a credit bureau without proper authorization.

BRIEF DESCRIPTION OF THE DRAWINGS

These and other objects, features, and advantages of the present invention will become better understood upon review of the following description and accompanying drawings, in which:

FIG. 10 is a third example of a screen seen by a client at the client's computer or computer terminal when the client initiates the reporting of credit information to a credit bureau, in accordance with the present invention;

FIG. 13 is an example of a credit bureau response resulting from a client request for credit information, according to the present invention.

DETAILED DESCRIPTION OF THE INVENTION

The invention summarized above and defined by the enumerated claims may be better understood by referring to the following detailed description, which should be read in conjunction with the accompanying drawings. This detailed description of a particular preferred embodiment, set out below to enable one to build and use one particular implementation of the invention, is not intended to limit the enumerated claims, but to serve as a particular example thereof. The particular example set out below is the preferred specific implementation of the present invention. Those skilled in the art should appreciate that they may readily use the concepts and specific embodiment disclosed as a basis for modifying or designing other methods and systems for carrying out the same purposes of the present invention. Those skilled in the art should also realize that such equivalent assemblies do not depart from the spirit and scope of the invention in its broadest form.

Figure 1:
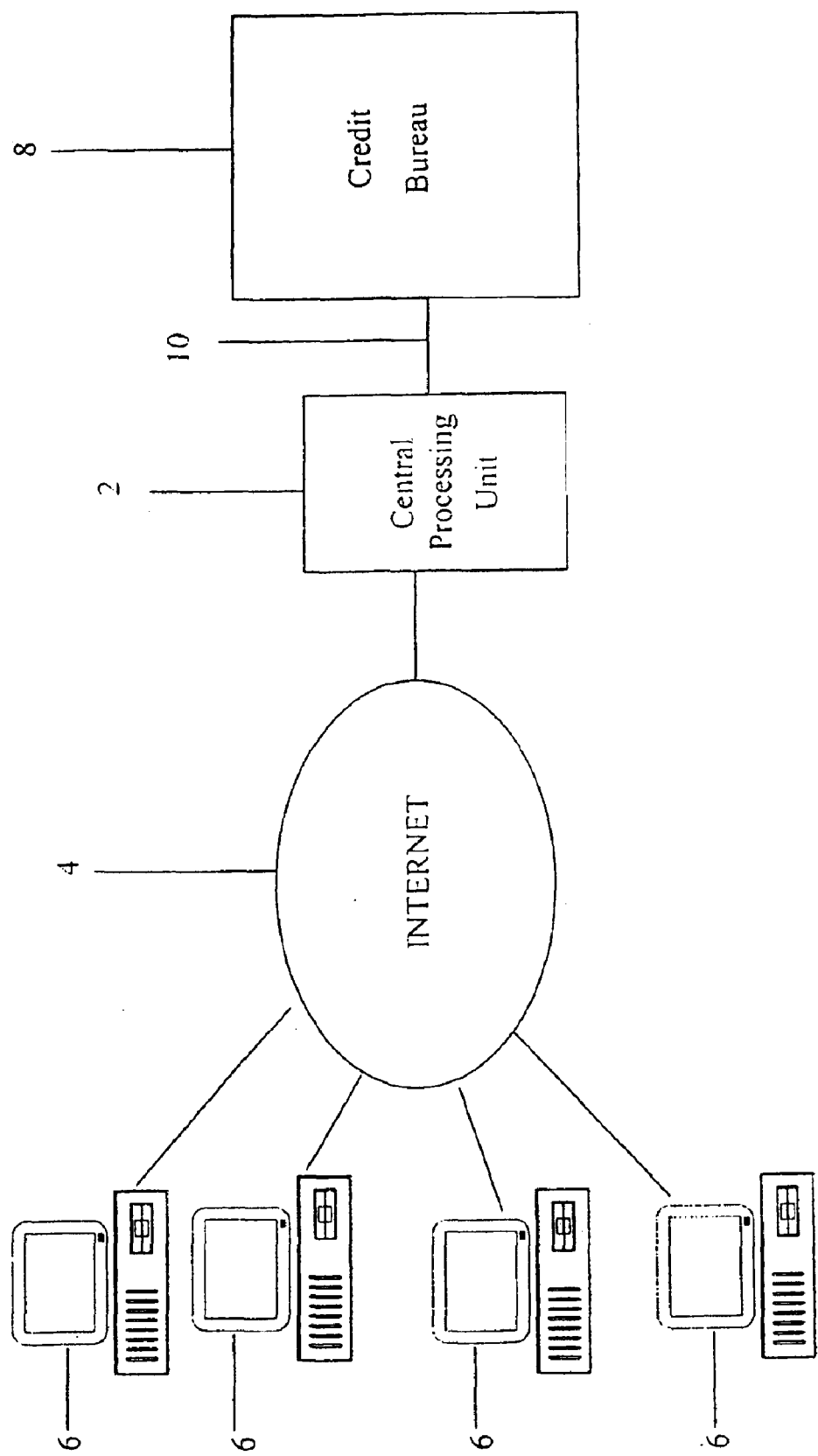
FIG. 1 is a block diagram of a system for clients to make credit inquiries and credit bureaus to deliver credit inquiry responses to clients, all in accord with the principles of the present invention.

FIG. 1 depicts a system that embodies the principles of the present invention (also referred to as "e-CBI"). The invention generally comprises an automated credit information inquiry, delivery, and reporting system as shown. The major components of the system include a service provider's central processing unit or CPU (also referred to as the "e-CBI server") 2 and a communication network 4 for connecting the CPU 2 to clients' personal or other computers or terminals 6.

The CPU 2 functions as centralized conduit for the collection and transmission of data between the clients 6 and the credit bureaus 8. The CPU 2 does not analyze or permanently save the results from the credit bureaus 8; rather, the CPU 2 passes the results directly to the client 6. Any number of clients 6 can access the CPU 2 to make inquiries for credit information or provide reports to the credit bureaus 8. The CPU 2 can be any mainframe, supermini, or minicomputer system having the capability of handling a real-time, multi-tasking, remote-access database application. In the preferred embodiment, the CPU 2 is an Intel 486 or higher processor-based computer running a UNIX operating system; however, any operating system with multiple-tasking capabilities is appropriate.

A common gateway interface (CGI) script (also referred to as CGI application or CGI application program) resides on the CPU 2. The CGI application consists of two program modules or processes—a main process and a child process. The main process communicates with the client 6 and performs functions such as preparing queries, decoding results received from the credit bureaus 8, and formatting responses. The child process communicates with the credit bureau's computer 8. The CGI application is written in the "C" program language. However, many other programming languages may be used to achieve the same functionality. The CGI application implements and controls the processing of requests (inquiries) from clients 6 for credit information from credit bureaus 8 and delivery of the responses from the credit bureaus 8 to the clients 6, and the reporting of credit information from clients 6 to the credit bureaus 8.

The CGI application's processes embody the functions described herein and illustrated in the appended flow charts. However, it should be apparent that there could be many different ways of implementing the invention in computer programming, and the invention should not be construed as limited to any one set of computer program instructions. Further, a skilled programmer would be able to write such computer programs to implement the disclosed invention without difficulty based on the flow charts and associated description. Therefore, disclosure of a particular set of program code is not considered necessary for an adequate understanding of how to make and use the invention.

Several configuration files govern the programs of the present invention. The configuration files can be used to adapt the present invention for retrieval of different inquiry responses from different credit bureaus. This allows customization without changing any of the "C" source code. The configuration files are categorized according to the inquiry and response features of the present invention.

The inquiry feature of the present invention (i.e., formulation and transmittal of the client's request for credit information) uses three types of configuration files. Session Definition Files determine which communication program should be used (i.e., serial or socket-based), names of various temporary files, which credit bureau 8 to contact, and other configuration files to use. Inquiry Definition Files describe the format of an Inquiry Segment (i.e., the data associated with a request that is sent to a credit bureau 8) required by a particular credit bureau 8. Finally, a Session Script File describes the negotiation process required to log on to a credit bureau's computer, send the Inquiry Segment, and receive from the credit bureau 8 either a Report Segment (i.e., the data containing the credit inquiry response from the credit bureau 8) or an Error Segment (i.e., data related to errors in retrieving or transmitting credit bureau responses).

The response feature of the present invention (i.e., the return of a response from the credit bureau 8) uses two types of configuration files. The first type, a Report Description File, describes the format used by the credit bureau 8 when returning the response to the client inquiry to the CPU 2 in the form of a binary data segment. This file allows the programs to decipher or parse the incoming data. Output Description Files, the second type of configuration file associated with the response feature, describe how the data segment returned by the credit bureau 8 and parsed by the programs should be displayed on the client's computer screen, printed on the client's printer, and saved in the client's internal archive files.

A communications network 4, preferably the Internet, connects the CPU 2 to the clients' computers. Alternatively, the communications network 4 may take a variety of other forms, such as a local area network, a wide area network, a satellite communications network, a cellular communications network, ordinary telephone lines, or private leased lines. The CPU 2 is also linked to one or more credit bureaus 8 by dedicated lines 10.

In the preferred embodiment, the present invention uses the Internet 4 for communications between the clients' computers and the CPU 2 (which functions as a web server), and the clients' computers have web browsers to access a web site hosted on the CPU 2. To access the system of the present invention, the client 6, preferably, has the following: (1) a computer with access to the Internet 4, such as a personal computer with an Internet connection, although a mini-computer or mainframe computer may also be used; (2) means for secure transmission over the Internet, such as a web browser with 128-bit secure sockets layer (SSL) encryption capability; and (3) an account set up on the central processor 2. In addition, a security certificate issued by a trusted certifying authority, such as Verisoft, is installed on the client's computer and on the CPU 2.

Communications between a web browser and a web server are typically made according to the HyperText Transfer Protocol (HTTP). However, HTTP is generally not secure. To provide additional security, public-key authentication and encryption can be added to the HTTP. In the preferred embodiment, the CPU 2 of the present invention uses Hypertext Transfer Protocol Secure (HTTPS), which is a type of server software providing digital certificate encryption of data using SSL technology. SSL technology is the standard industry method for protecting web communications.

The present invention provides isolation of the client 6 or third parties from the credit bureau 8, which is achieved by the CPU 2 having two separate physical Ethernet interface cards. One card connects to the Internet-visible LAN and responds only to HTTP data packet traffic, providing basic HTTP web server functionality. The CGI program, initiated by clients 6 through the HTTP/HTML interface, formats client 6 requests and initiates communications with a credit bureau 8 through the second Ethernet card. At no time is three any possibility of a direct feed-through of TCP/IP data packets between the two Ethernet cards—only the CGI program has access to a credit bureau's router. Clients 6 cannot directly connect to the credit bureau 8 because all communications must pass through the CPU 2. The CPU 2 thus performs a proxy function. Outside parties cannot physically gain access to and retrieve information from a credit bureau 8 without first being properly authorized, resulting in a secure interface to the credit bureau 8.

Figure 2:
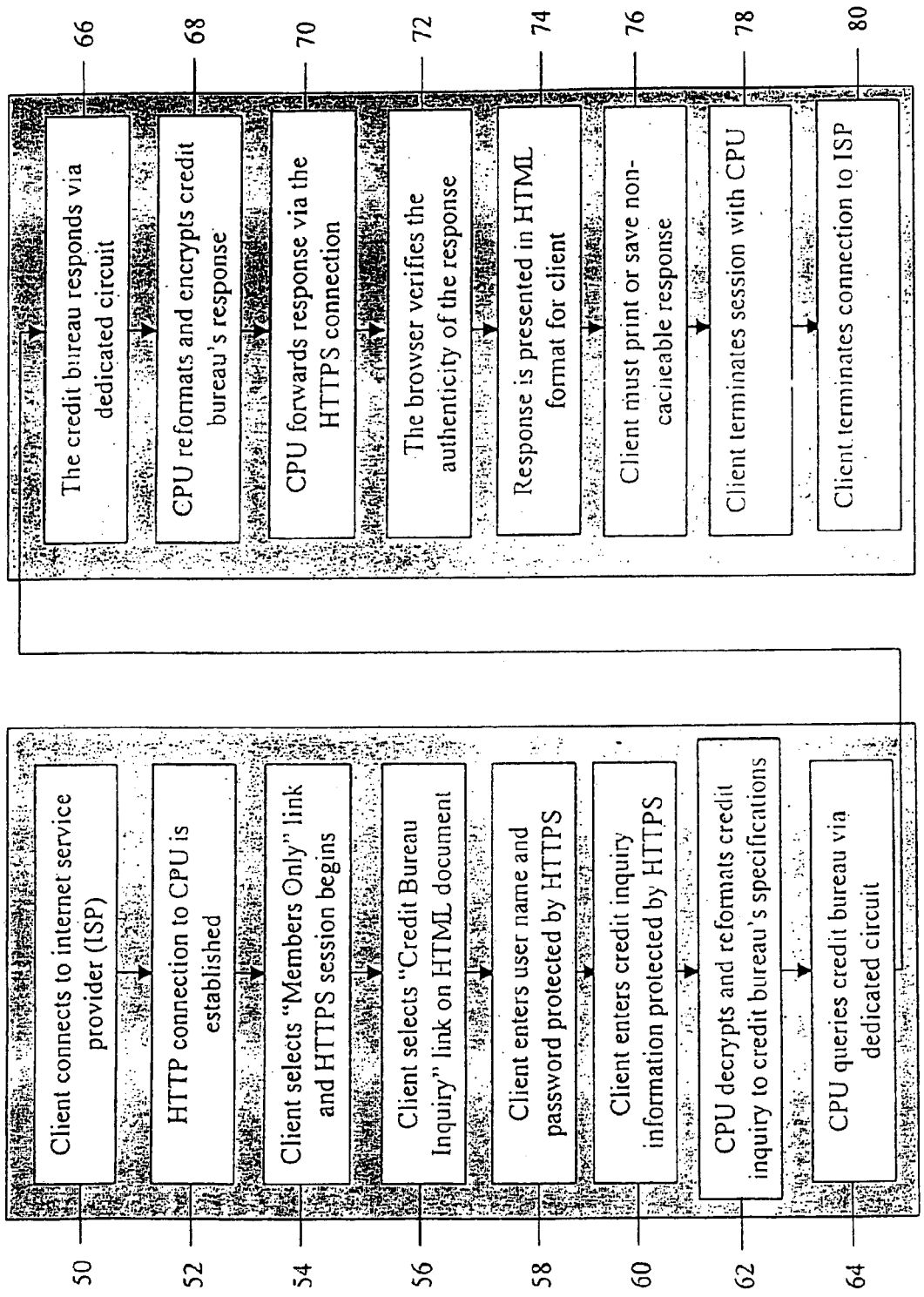
FIG. 2 is a flow diagram of a process for requesting credit information from credit bureaus and delivering responses to clients, in accord with the principles of the present invention.
Figure 3:
FIG. 3 is an example of a screen seen by a client at the client's computer or computer terminal when the client establishes an HTTP connection to the service provider's central processing unit, according to the present invention.
Figure 4:
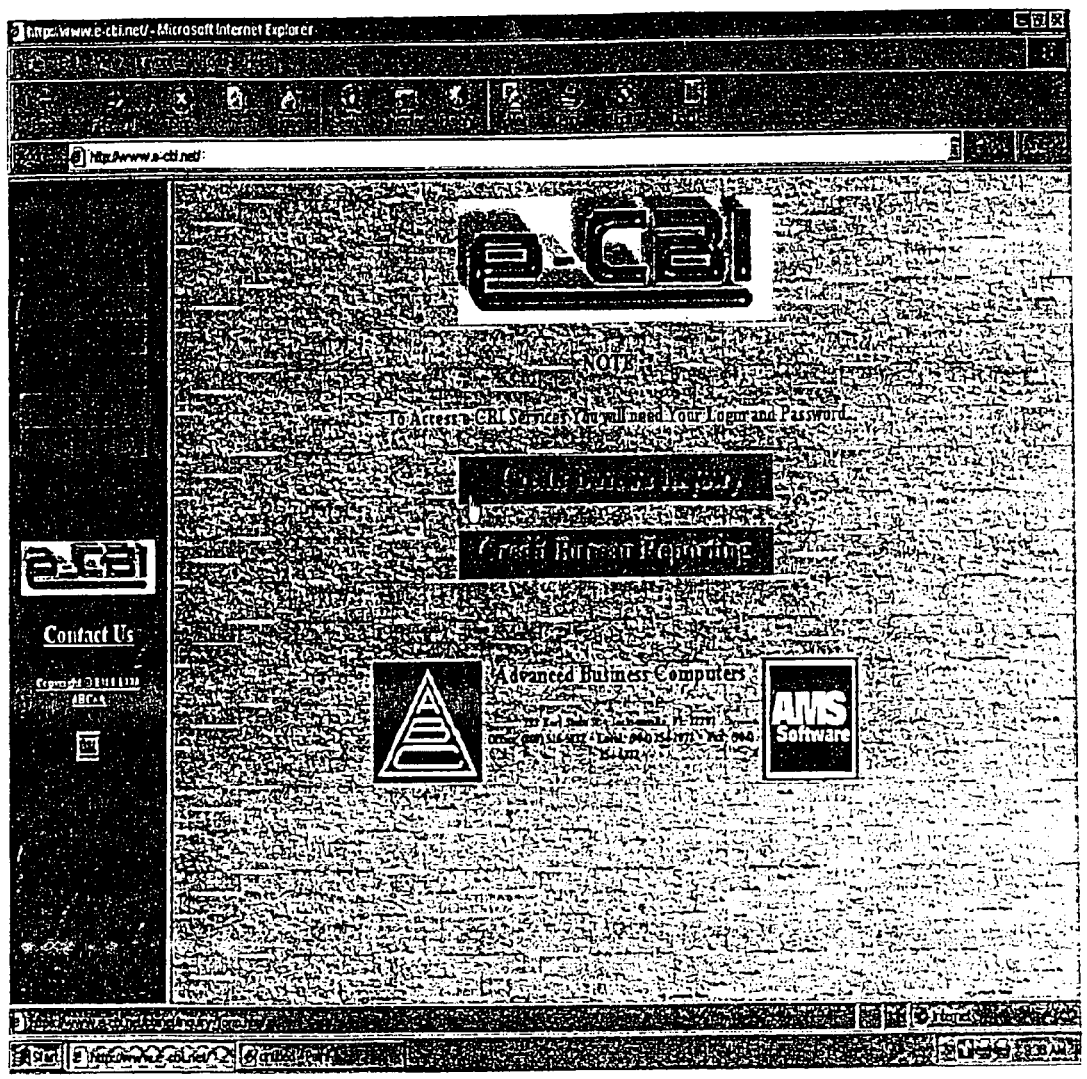
FIG. 4 is an example of a screen seen by a client at the client's computer or computer terminal after the client has selected the "Members Only" link on the screen of FIG. 3, wherein the client is selecting the "Credit Bureau Inquiry" link.
Figure 5:
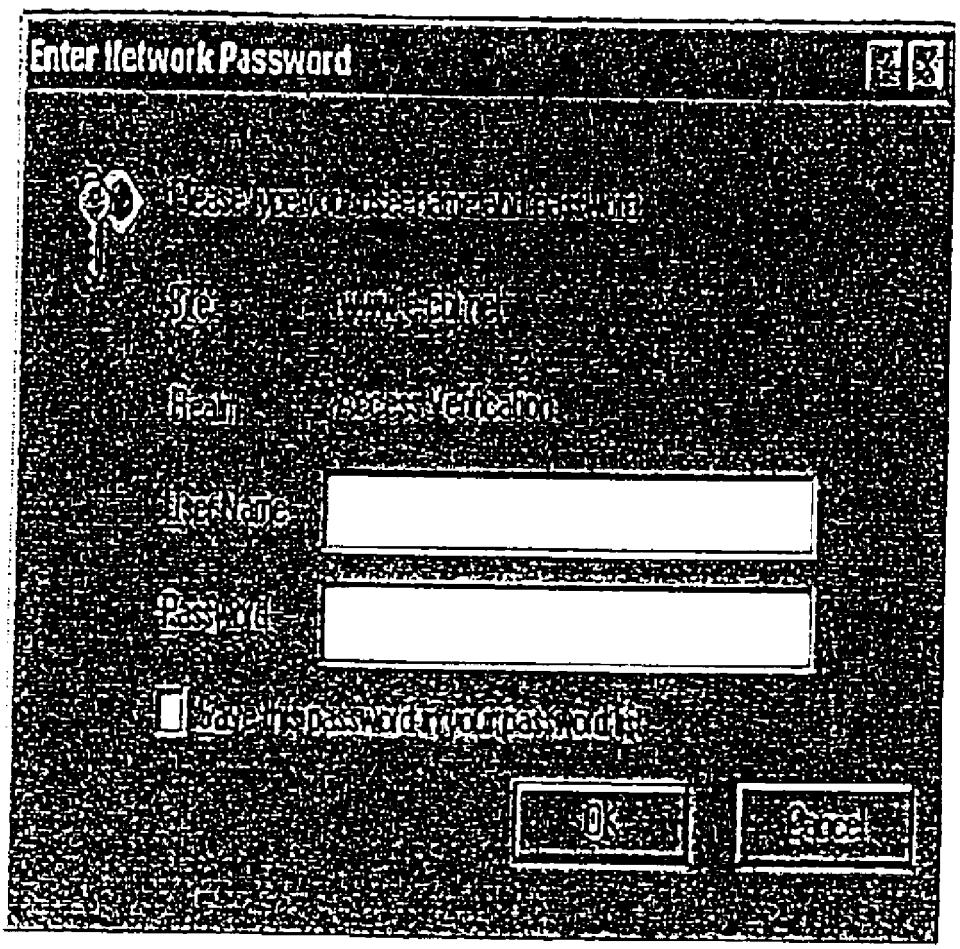
FIG. 5 is an example of a screen seen by a client at the client's computer or computer terminal requesting the client to enter a user name and password, according to the present invention.

FIG. 2 depicts the high-level procedures involved in making credit inquiries and receiving credit bureau responses to inquiries. When a client 6 wants to request credit information from a credit bureau 8, the client 6 first logs on to the CPU 2 by connecting to an Internet Service Provider (ISP) 50 and establishing an HTTP connection 52 to the CPU 2. FIG. 3 illustrates the first screen displayed to the client 6. The client 6 selects the link for "Members Only," initiating an HTTPS session 54. On the next screen displayed to the client 6, the client 6 selects the link for "Credit Bureau Inquiry" 56, shown in FIG. 4. The client 6 provides a user name and password, as shown in FIG. 5, which is protected by HTTPS 58. The CGI application on the CPU 2 performs user authentication, preventing unauthorized users from accessing the services of the present invention.

Figure 6:
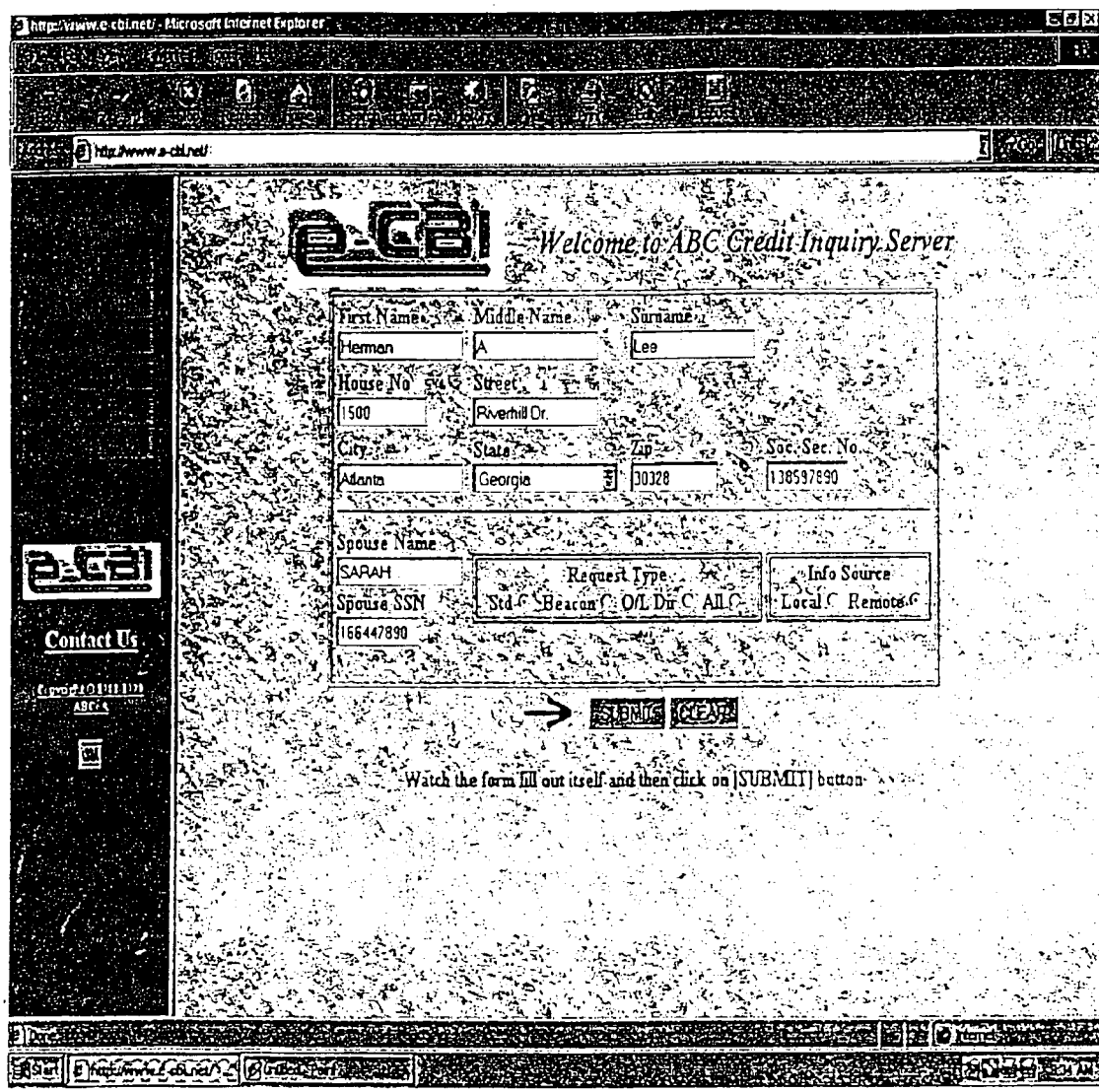
FIG. 6 is an example of a screen seen by a client at the client's computer or computer terminal when the client initiates a request for credit information, in accordance with the present invention.

Next, the client 6 enters credit inquiry data (e.g., customer name, address, and social security number), protected by HTTPS, within text boxes on an Inquiry Form provided by the web site of the present invention 60. FIG. 6 illustrates an example of the Inquiry Form. The data entered by the client 6 are in the HyperText Markup Language (HTML) format. When the client 6 clicks a "SUBMIT" button on the Inquiry Form, as shown in FIG. 6, the CPU 2 verifies that the client's web browser supports standard 128-bit SSL technology. If this technology is supported, then the client's web browser encrypts the data using the standard 128-bit SSL technology, and the encrypted data is passed to the CGI application residing on the CPU 2. If the client's web browser does not support 128-bit SSL technology, then the CPU 2 sends the client 6 a message stating that a 128-bit version of, for example, the Netscape Navigator or Microsoft Internet Explorer web browser must be downloaded before proceeding.

Figure 7:
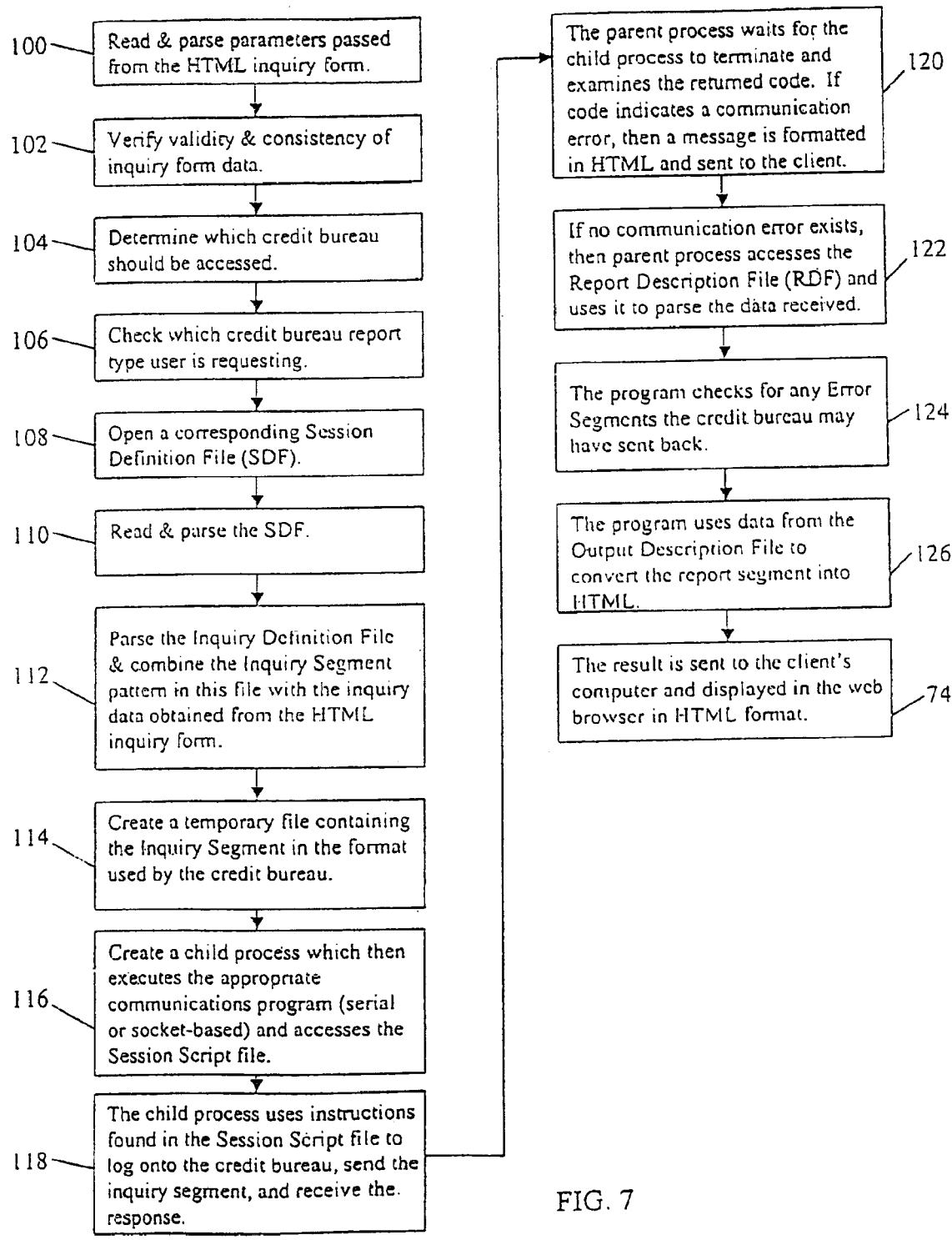
FIG. 7 is a functional flow diagram of the central processing unit's software according to the present invention.

Whenever, a client 6 requests credit information from, or reports credit information to, a credit bureau 8, the CPU 2 exhibits the CGI program. The CGI application's main process first decrypts the data 62. Referring to the CPU 2 program flow illustrated in FIG. 7 and to the inquiry procedural flow of FIG. 2, the main process then reads and parses the parameters passed from the HTML Inquiry Form 100, verifying the validity and consistency of the Inquiry Form data 102.

After determining which credit bureau 8 to access 104, the main process determines which type of credit bureau response the client 6 is requesting 106. For example, referring to the embodiment of the present invention depicted in FIG. 6, clients 6 may request the following types of responses: "Std" (Standard), "Beacon," "O/L Dir" (Online Directory), and "All." These choices reflect the types of products that are available from Equifax. If a client 6 wants to make a standard inquiry and receive no additional information from Equifax, then the client 6 selects "Std." If the client 6 selects "Beacon," Equifax will send the client 6 an additional product called a Beacon® score, which is a scoring system developed by Equifax to help creditors make credit decisions. If the client 6 selects "O/L Dir," Equifax will send the client 6 an additional product called Online Directory, which provides the client 6 with telephone numbers for companies provided in the response to the inquiry. Finally, if the client 6 selects "All," then Equifax will send both Beacon® and Online Directory as additional products.

After determining the type of credit bureau response, the main process opens the corresponding Session Definition File (SDF) 108. The main process then reads and parses the SDF 110 and the Inquiry Definition File (IDF), and combines the Inquiry Segment pattern (i.e., the data pattern required by the credit bureau 8) in the IDF with the SDF data and the inquiry data obtained from the HTML Inquiry Form 112. The main process places the reformatted data into an input file. The result is a temporary file containing the Inquiry Segment in the standard format required by the particular credit bureau 8 to receive the request 114.

The standard format, for example, for Equifax, is called "System-to-System." All major credit institutions have a similar standard for providing an on-line credit inquiry and reporting interface with their central computers. With proper credit institution approval, the present invention can be configured to interface with any of these credit institutions by programming a separate CGI application for each credit institution. Generally, a credit bureau's interface standard contains the following: (1) a list of supported communication protocols/methods; (2) a list of available sign-on procedures; and (3) a list of settings the credit bureau's computer expects to be answered before data transmission can proceed.

After reformatting the data, the CGP application "forks" the program (i.e., initiates the child process) 116. The child process, in the form of the proxy application, initiates a query to the credit bureau's computer 8 by executing a communications program 116. The communications program accesses the Session Script File and uses instructions found in the file to log on to the credit bureau's computer 118 over a dedicated connection circuit or line 10. The dedicated line 10 is a high-speed, unshared communications link between the CPU 2 and the credit bureau 8. The communications program transmits the Inquiry Segment 64 to the credit bureau 8 and receives the non-HTML response 66 in the form of a Report Segment or an Error Segment.

Upon receiving the credit bureau's response, the child process creates an output file containing the response. The parent process (i.e., the main process of the CGI applicator) waits for the child process to terminate, and then examines the returned data 120. If the data indicates a communication error, the parent process sends an appropriate message in HTML format to the client 120. If no communications error occurred, the parent process accesses the Report Description File and uses the file to parse the received data in the output file 122. The parent process then determines whether the returned segment was an Error Segment 124. Error Segments are generated by a credit bureau 8 if the credit bureau 8 experiences an internal error or if the Inquiry Segment contained invalid data, such as a name and social security number that are not found in the credit bureau's files.

The parent process accesses the Output Description File (ODF), parses the ODF, and uses the information found in the ODF to convert the Report Segment received from the credit bureau 8 into the format defined in the ODF (preferably HTML) 126. The parent process then encrypts the HTML data using 128-bit SSL technology 68 and sends the result over the Internet 4 to the client's computer 70. The response is displayed in its native format, which could be either a text-oriented terminal or, preferably, an HTML-based browser 74. In the preferred embodiment, the data is displayed in a web browser after verification of the authenticity of the response 72 in a more readable format. The response is not cacheable 76. To preserve the response, the client 6 must print or save the response 76.

When the client 6 is finished, the client terminates the session with the central processor 2 of the present invention 78, and finally terminates the connection with the ISP 80. Normally, in about 5 seconds to about 10 seconds, the credit bureau 8 will have processed the request and returned the report to the CPU 2. Likewise, the transaction may be completed and the report made available to the client 6 in about 5 seconds to about 10 seconds, depending on factors such as bandwidth, types of computers used, and number of users.

Figure 8:
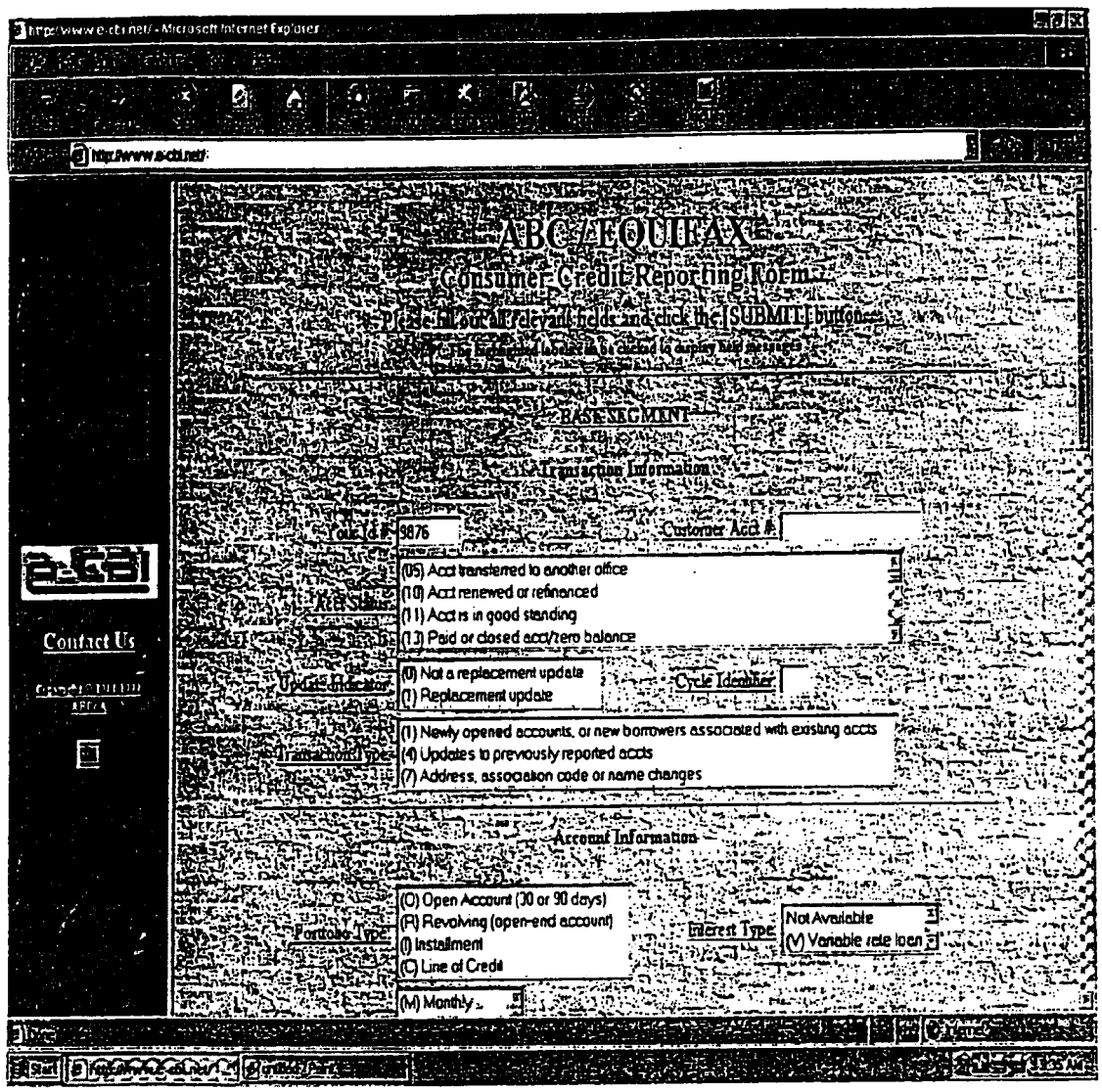
FIG. 8 is an example of a screen seen by a client at the client's computer or computer terminal when the client initiates the reporting of credit information to a credit bureau, in accordance with the present invention.
Figure 9:
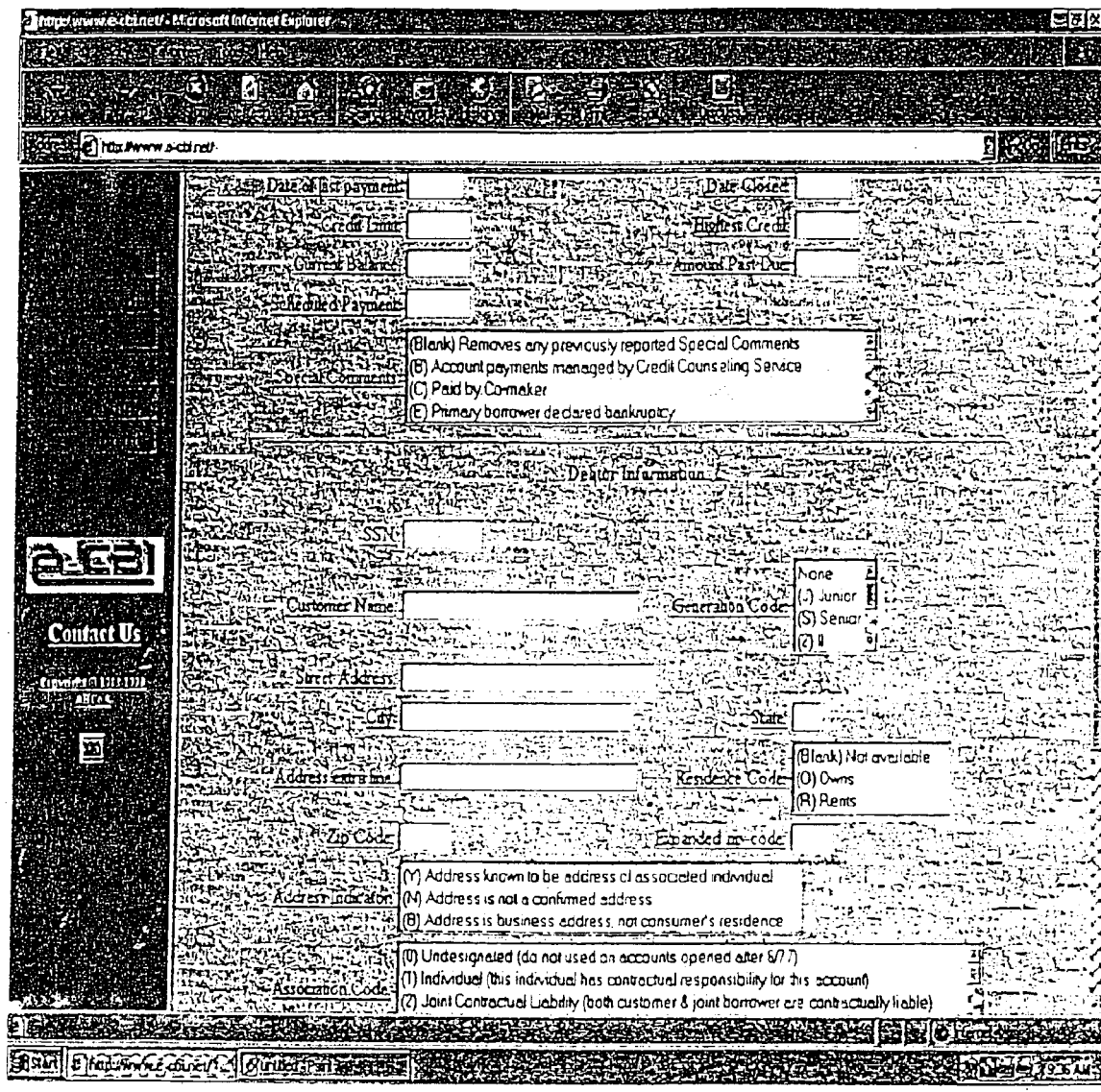
FIG. 9 is another example of a screen seen by a client at the client's computer or computer terminal when the client initiates the reporting of credit information to a credit bureau, in accordance with the present invention.
Figure 10:
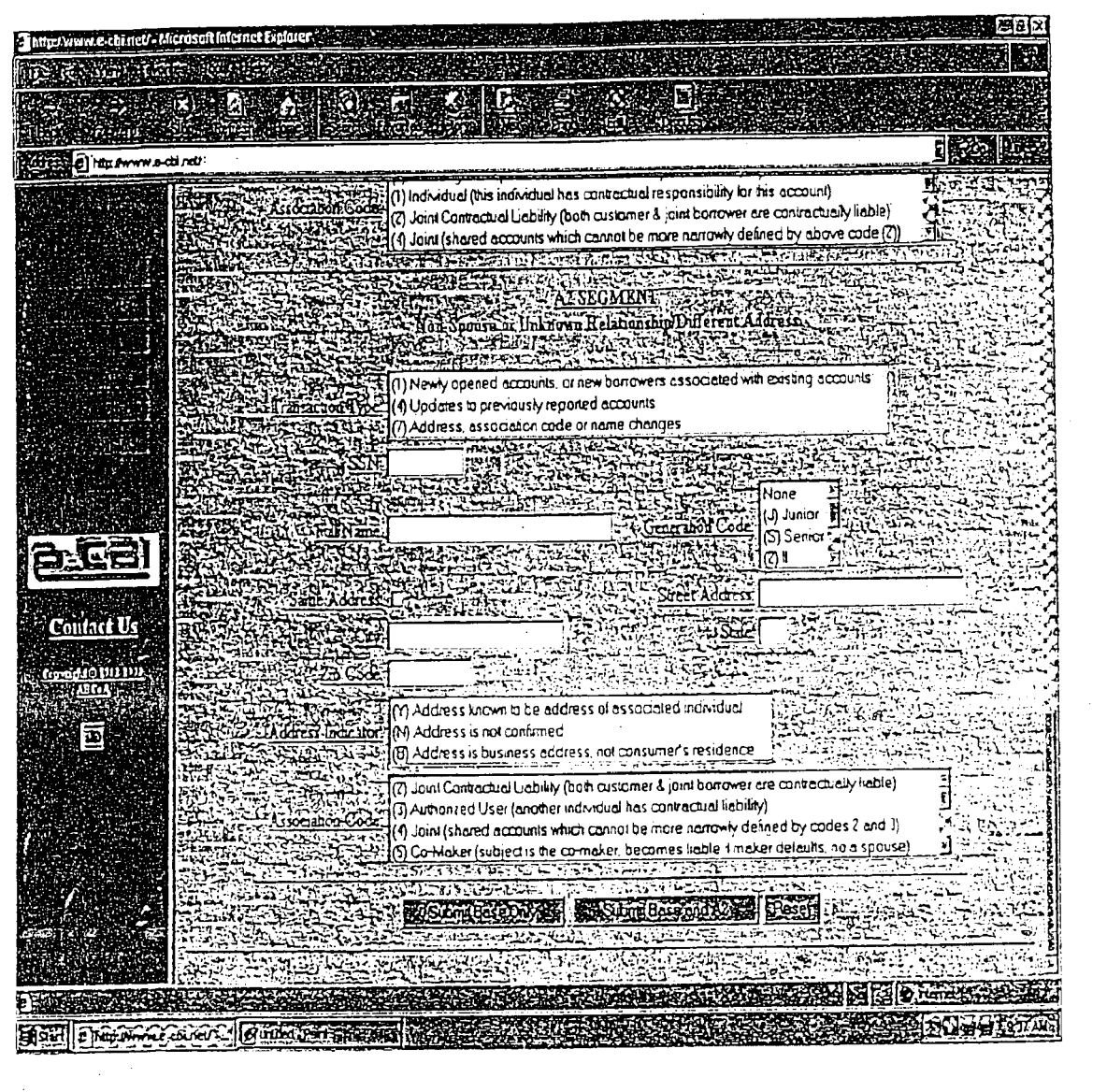

The present invention also allows clients 6 to report credit information to the credit bureau 8. Examples of forms the client 6 completes for credit reporting are shown in FIGS. 8–10. The preferred embodiment for the credit reporting aspect of the present invention uses the "Metro" format standard. The Metro format is a universal standard that all major credit institutions adhere to. The format defines codes to report for credit criteria such as past due status, repossession, and bankruptcy. The present invention warehouses these reports for approximately a 30-day period. Then, the reports are downloaded to tape media, and the tapes are forwarded to the appropriate credit bureau 8.

Figure 11:
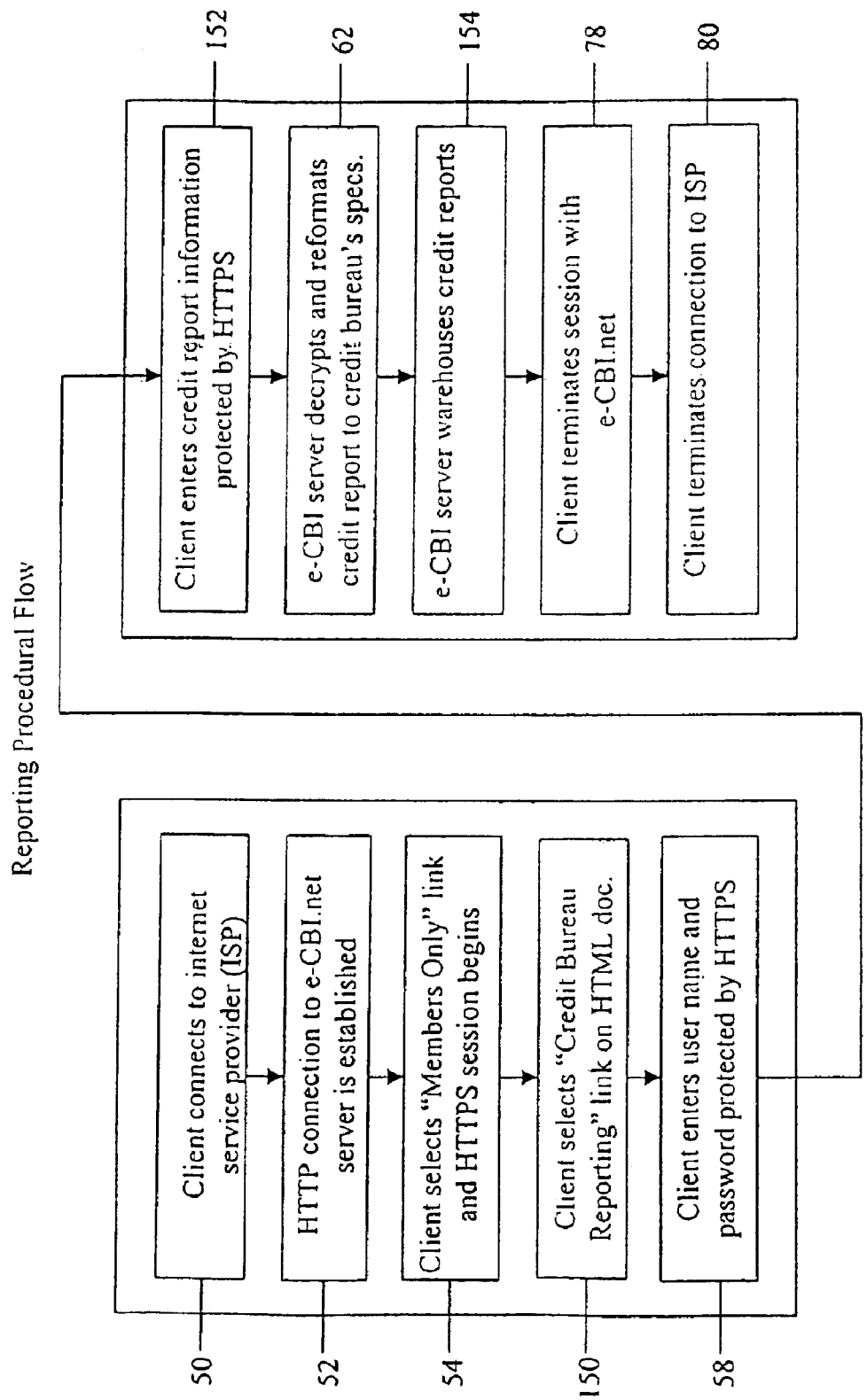
FIG. 11 is a flow diagram of a process for reporting credit information to a credit bureau according to the principles of the present invention.
Figure 12:
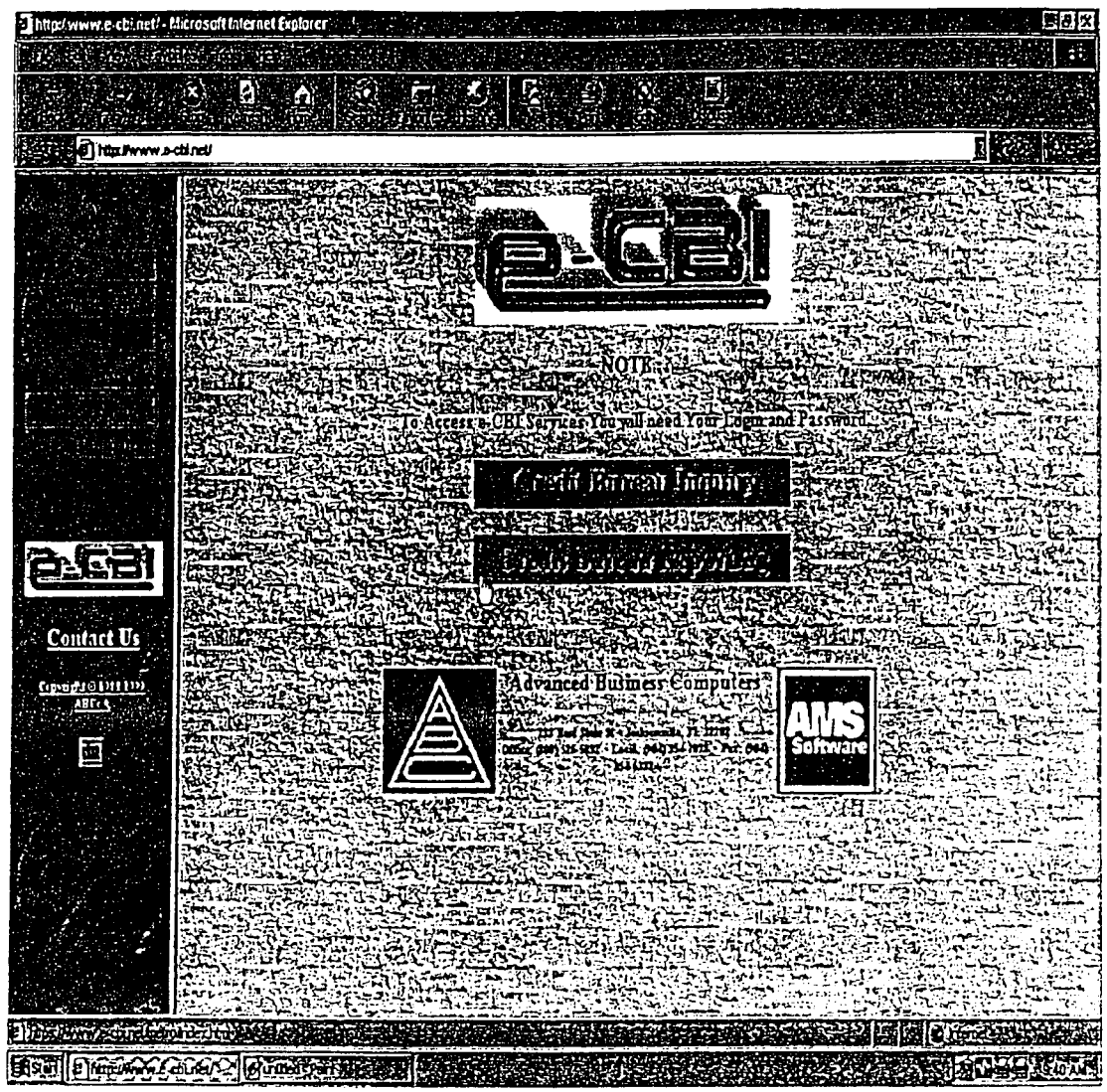
FIG. 12 is an example of a screen seen by a client at the client's computer or computer terminal after the client has selected the "Members Only" link on the screen of FIG. 3, wherein the client is selecting the "Credit Bureau Reporting" link.

The procedures for providing credit information to a credit bureau 8 are illustrated in FIG. 11. The procedures are similar to the procedures for requesting a credit inquiry, except that the client 6 selects the link for "Credit Bureau Reporting" 150 rather than "Credit Bureau Inquiry" 56, as shown in FIG. 12, and enters credit report 152 rather than credit inquiry 60 information. In addition, after the CPU 2 decrypts and reformats the data transmitted to it from the client 6, the CPU 2 warehouses the data 154 rather than sending the data immediately to the credit bureau 8. Approximately once a month, the service provider downloads the reports to tape media and forwards the tapes to the appropriate credit bureau 8.

Accordingly, the present invention provides efficient and secure delivery and reporting of personal credit information to and from credit institutions using the Internet. Among the advantages include the ability to use standard web browsers and the HTML format for more easily read and understood credit information.

EXAMPLE

The following example illustrates how a client 6 might use the present invention to request personal credit information pertaining to a potential customer.

Herman would like to purchase a car. Herman drives to his local car dealer and finds a car he likes. He will need financing to purchase the car.

The car dealer is a client of e-CBI. The car salesman, Joe, needs a credit report on Herman to complete the loan application, so he finds an available personal computer (PC) at the dealership. The PCs in the dealership have web browsers with 128-bit SSL encryption capabilities. The PCs also have access to the Internet through the services of a local ISP.

Joe connects to the Internet and uses the web browser to access e-CBI's web site, establishing an HTTP connection to the e-CBI central processing unit (i.e., web server). On the initial screen, Joe selects the link for "Members Only," initiating an HTTPS session. See FIG. 3. On the next screen to appear, Joe selects the link for "Credit Bureau Inquiry" and enters a username and password. See FIGS. 4 and 5. An Inquiry Form is displayed to collect the credit information. See FIG. 6. Joe enters credit inquiry data about Herman on the Inquiry Form, which is an HTML format. Joe also selects a standard type of response from the credit bureau. When Joe completes the form, he clicks the "SUBMIT" button on the form. The web browser on Joe's computer encrypts the data and sends it to a CGI application on e-CBI's server.

The CGI application decrypts the data. The CGI application parses the decrypted data, verifying the validity and consistency of the data. In this example, the credit bureau to access is pre-selected to be Equifax. Based upon the credit bureau report type entered on the Inquiry Form, the CGP application opens a corresponding Session Definition File (SDF). The CGI application parses the SDF and Inquiry Definition File (IDF) and combines the Inquiry Segment pattern in the IDF with the SDF data and inquiry data from the Inquiry Form. The data, which is now formatted to meet the credit bureau's requirements, is placed into an input file.

The CGI application initiates a child (proxy) application, which executes a communications program. The communications program uses data in the Session Script File to log on to the credit bureau's computer and send the Inquiry Segment to the credit bureau over a dedicated line. Assuming the credit bureau has credit information concerning Herman and no errors in transmission occur, the credit bureau uses the Inquiry Segment to pull a credit report, and sends the non-HTML credit report as a Report Segment back to the child process on the e-CBI server. The child process places the Report Segment into an output file. Control returns to the parent.

Assuming no communications errors, the CGI application uses data in the Report Description File to parse the data in the output file. The CGI application uses data in the Output Description File to convert the Report Segment in the output file to HTML format.

The CGI application encrypts the output file and sends the result over the Internet to Joe's computer, where the data is displayed in Joe's web browser as a credit report for Herman. An example of a credit bureau response is provided in FIGS. 13A–13D. Joe prints a copy of the report, then ends the session with e-CBI and terminates the connection with his ISP. Approximately 10 seconds elapsed from the time Joe submitted the credit information to e-CBI until the report was displayed on his computer screen.

What is claimed is:

1. A computer-based system for a client to communicate with a credit bureau, the system comprising:
 (a) a client terminal having a web browser for:
  entering and displaying in HTML format a credit inquiry pertaining to a client customer and receiving a response to the credit inquiry from the credit bureau, or
  entering and displaying in HTML format a credit report about the client customer, the client terminal being operated by the client;
 (b) a central processing unit (CPU) functioning as a web server, the CPU having and executing a common gateway interface (CGI) application program for directing the operations of the CPU and controlling the formatting and transmitting of the credit inquiry and credit bureau response between the client terminal and the credit bureau;

(c) a first communications link for connecting the client terminal to the CPU, thereby facilitating the transfer of the credit inquiry or the credit report from the client terminal to the CPU, and the transfer of the credit bureau response from the CPU to the client terminal, the first communications link comprising the Internet; and (d) a second communications link for connecting the CPU to the credit bureau, thereby facilitating the transfer of the credit inquiry from the CPU to the credit bureau, and the transfer of the credit bureau response from the credit bureau to the CPU, the second communications link comprising a dedicated line;

whereby the format of the credit bureau response is converted and displayed to the client in HTML format, providing credit information to the client in a format that is more easily read and understood than the format provided by the credit bureau;

whereby the client is able to send credit information about a client customer electronically to the service provider, the service provider then forwarding the credit information to the credit bureau, providing the ability for the client to generate the credit report on-line for submission to the credit bureau; and whereby the client is able to enter the credit report in the web browser of the client terminal in HTML format, rather than using the format required by the credit bureau, providing easier and better understood entry of the credit information.

2. The system of claim 1, wherein the client terminal includes:
(a) means for entering the credit inquiry in HTML format;
(b) means for encrypting the credit inquiry;
(c) means for transmitting the encrypted credit inquiry to the CPU over the Internet;
(d) means for receiving the credit bureau response from the CPU over the Internet, the credit bureau response having been transmitted to the CPU from the credit bureau and converted to HTML format and encrypted by the CPU before being transmitted to the client terminal;
(e) means for decrypting the received credit bureau response; and
(f) means for displaying the decrypted credit bureau response to the client in HTML format.

3. The system of claim 2, wherein the means for entering the credit inquiry includes displaying electronic credit inquiry forms in HTML format in the web browser of the client terminal, the forms being provided by the CPU.

4. The system of claim 2, wherein the means for encrypting and the means for decrypting are provided by the web browser, the web browser supporting 128-bit secure sockets layer (SSL) encryption capability.

5. The system of claim 1, wherein the CGI application program has a parent process and a child process.

6. The system of claim 5, wherein the parent process includes:
(a) means for receiving the credit inquiry in encrypted HTML format over the Internet from the client terminal;
(b) means for decrypting the encrypted credit inquiry;
(c) means for converting the decrypted credit inquiry into a format acceptable by the credit bureau;

(d) means for passing the converted credit inquiry to the child process;
(e) means for receiving the credit bureau response from the child process, the credit bureau response having been transmitted to the child process from the credit bureau and being in the format acceptable to the credit bureau;
(f) means for converting the credit bureau response to HTML format;
(g) means for encrypting the HTML credit bureau response; and
(h) means for transmitting the encrypted HTML credit bureau response to the client terminal over the Internet.

7. The system of claim 6, wherein the means for encrypting and the means for decrypting are provided by the CPU, the CPU supporting 128-bit secure socket layer (SSL) encryption capability.

8. The system of claim 7, wherein the child process includes:
(a) means for receiving the credit inquiry from the parent process, the credit inquiry being in the format acceptable to the credit bureau;
(b) means for sending the converted credit inquiry to the credit bureau over the dedicated line;
(c) means for receiving the credit bureau response over the dedicated line, the credit bureau response having been generated by the credit bureau in response to the credit inquiry and being in the format acceptable to the credit bureau; and
(d) means for passing the credit bureau response to the parent process.

9. The system of claim 1, wherein the CPU further includes means for isolating the client from the credit bureau such that the client cannot directly connect to the credit bureau.

10. The system of claim 1, wherein the client terminal includes:
(a) means for entering the credit report in HTML format;
(b) means for encrypting the credit report; and
(c) means for transmitting the encrypted credit report to the CPU over the Internet.

11. The system of claim 10, wherein the means for entering the credit report includes displaying electronic credit report forms in HTML format in the web browser of the client terminal, the forms being provided by the CPU.

12. The system of claim 10, wherein the means for encrypting and the means for decrypting are provided by the web browser, the web browser supporting 128-bit secure sockets layer (SSL) encryption capability.

13. The system of claim 1, wherein the CPU includes:
(a) means for receiving the credit report in encrypted HTML format over the Internet from the client terminal;
(b) means for decrypting the encrypted credit report;
(c) means for converting the decrypted credit report into a format acceptable by the credit bureau;
(d) means for storing the credit report for approximately 30 days; and
(e) means for downloading the stored credit report to a tape medium, the tape then being forwarded to the credit bureau.

14. The system of claim 13, wherein the means for decrypting is provided by the CPU, the CPU supporting 128-bit secure socket layer (SSL) encryption capability.

15. The system of claim 1, wherein the CPU further includes means for isolating the client from the credit bureau such that the client cannot directly connect to the credit bureau.

16. A method for transmitting a credit inquiry and a credit bureau response between a client and a credit bureau or for providing a credit report from a client to a credit bureau, the method comprising:

performing at least one of a first and second series of steps wherein said final series of steps comprises:
- (a) providing a client terminal having a web browser, the client terminal being operated by the client;
- (b) entering the credit inquiry in the web browser in HTML format;
- (c) providing a first communications link for connecting the client terminal to the CPU, the first communications link comprising the Internet;
- (d) providing a service provider;
- (e) providing a central processing unit (CPU) functioning as a web server and being operated by the service provider, the CPU having and executing a common gateway interface (CGI) application program for directing the operations of the CPU and controlling the formatting and transmitting of the credit inquiry and the credit bureau response between the client terminal and the credit bureau;
- (f) transmitting the credit inquiry form the client terminal to the CPU across the Internet;
- (g) receiving the credit inquiry by the CPU;
- (h) converting the credit inquiry, by the CPU, from HTML format to a required credit bureau format;
- (i) providing a second communications link, the second communications link comprising a dedicated line;
- (j) transmitting the credit inquiry from the CPU to the credit bureau, the credit bureau receiving the credit inquiry and generating the credit bureau response in accordance with the credit inquiry, the credit bureau response being in the required credit bureau format;
- (k) transmitting the credit bureau response to the CPU over the dedicated line;
- (l) receiving the credit bureau response by the CPU;
- (m) converting the credit bureau response, by the CPU, from the credit bureau format to HTML format;
- (n) transmitting the credit bureau response in HTML format from the CPU to the client terminal;
- (o) receiving the credit bureau response in the client terminal; and
- (p) displaying the credit bureau response in the web browser of the client terminal in HTML format;

whereby the format of the credit bureau response is converted and displayed to the client in HTML format, providing credit information to the client in a format that is more easily read and understood than the format provided by the credit bureau;

whereby the client is able to send credit information about a client customer electronically to the service provider, the service provider then forwarding the credit information to the credit bureau, providing the ability for the client to generate an on-line credit report for submission to the credit bureau;

wherein said second series of steps comprises:
- (a) providing a client terminal having a web browser, the client terminal being operated by the client;
- (b) entering the credit report in the web browser in HTML format;
- (c) providing a first communications link for connecting the client terminal to the CPU, the first communications link comprising the Internet;
- (d) providing a service provider;
- (e) providing a central processing unit (CPU) functioning as a web server and being operated by the service provider, the CPU having and executing a common gateway interface (CGI) application program for directing the operations of the CPU and forwarding the credit report to the credit bureau;
- (f) transmitting the credit report from the client terminal to the CPU across the Internet;
- (g) receiving the credit report by the CPU;
- (h) converting the credit report, by the CPU, from HTML format to a required credit bureau format;
- (i) storing the credit report for approximately 30 days in the CPU;
- (j) downloading the stored credit report to a tape medium; and
- (k) forwarding the tape to the credit bureau;

whereby the sending and receiving of credit information is entirely automatic, enabling the client to receive responses to credit inquiries in a quick and efficient manner;

whereby the client is able to enter the credit report in the web browser of the client terminal in HTML format, rather than using the format required by the credit bureau, providing easier and better understandable entry of the credit information.

17. The method of claim 16, wherein the step of entering the credit inquiry in the web browser comprises displaying electronic credit inquiry forms in HTML format in the web browser, the forms being provided by the CPU.

18. The method of claim 16, further comprising the steps of:
- (a) encrypting the credit inquiry before transmitting the credit inquiry from the client terminal to the CPU;
- (b) decrypting the credit inquiry by the CPU before converting the credit inquiry from HTML format to the required credit bureau format;
- (c) encrypting the credit bureau response before transmitting the credit bureau response from the CPU to the client terminal; and
- (d) decrypting the credit bureau response before displaying the credit bureau response in the web browser of the client terminal.

19. The method of claim 18, wherein the steps of encrypting and decrypting comprise providing the web browser of the client terminal and the CPU with 128-bit secure sockets layer (SSL) encryption capability.

20. The method of claim 18, further comprising dividing the CGI application program into a parent process and a child process.

21. The method of claim 20, wherein:
- (a) the steps of receiving the credit inquiry by the CPU, decrypting the credit inquiry by the CPU, converting the credit inquiry to the required credit bureau format, converting the credit bureau response to HTML format, encrypting the credit bureau response, and transmitting the credit bureau response to the client terminal are performed by the parent process; and
- (b) the steps of transmitting the credit inquiry to the credit bureau and receiving the credit bureau response in the CPU are performed by the child process.

22. The method of claim 16, wherein the step of entering the credit report in the web browser comprises displaying electronic credit report forms in HTML format in the web browser, the forms being provided by the CPU.

23. The method of claim 16, further comprising the steps of:
   (a) encrypting the credit report before transmitting the credit report from the client terminal to the CPU; and
   (b) decrypting the credit report before converting the credit report from HTML format to the required credit bureau format.

24. The method of claim 23, wherein the steps of encrypting and decrypting comprise providing the web browser of the client terminal and the CPU with 128-bit secure sockets layer (SSL) encryption capability.

* * * * *